United States Patent
Choi et al.

(10) Patent No.: US 11,706,012 B2
(45) Date of Patent: **\*Jul. 18, 2023**

(54) METHOD AND APPARATUS FOR RECONFIGURING BANDWIDTH PART IN SIDELINK COMMUNICATION

(71) Applicants: Hyundai Motor Company, Seoul (KR); Kia Corporation, Seoul (KR)

(72) Inventors: Su Han Choi, Gyeonggi-do (KR); Gene Back Hahn, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,497

(22) Filed: Nov. 17, 2021

(65) Prior Publication Data
US 2022/0077996 A1    Mar. 10, 2022

Related U.S. Application Data

(63) Continuation of application No. 16/843,357, filed on Apr. 8, 2020, now Pat. No. 11,212,060.

(60) Provisional application No. 62/832,044, filed on Apr. 10, 2019.

(30) Foreign Application Priority Data

Mar. 18, 2020   (KR) .................. 10-2020-0033421

(51) Int. Cl.
*H04L 5/00*      (2006.01)
*H04W 8/24*      (2009.01)
*H04W 92/18*     (2009.01)

(52) U.S. Cl.
CPC .......... *H04L 5/0092* (2013.01); *H04L 5/0082* (2013.01); *H04L 5/0098* (2013.01); *H04W 8/24* (2013.01); *H04W 92/18* (2013.01)

(58) Field of Classification Search
CPC ................................ H04L 5/00; H04L 5/0092
See application file for complete search history.

(56) References Cited

U.S. PATENT DOCUMENTS

2020/0053524 A1\* 2/2020 Novlan .................. H04W 4/08

OTHER PUBLICATIONS

3GPP, "BWP Operation for V2X Sidelink", Huawei, HiSilicon, 3GPP TSG RAN WGI Meeting 96bis, R1-1904690, Apr. 8-12, 2019, 6 pages.

(Continued)

*Primary Examiner* — Sulaiman Nooristany
(74) *Attorney, Agent, or Firm* — Fox Rothschild LLP

(57) ABSTRACT

An operation method of a first terminal in a communication system is provided. The method includes transmitting, to a base station, a configuration request message requesting configuration of a sidelink (SL) bandwidth part (BWP) used for sidelink communication between the first terminal and a second terminal. A configuration information message is received including configuration information of the SL BWP from the base station. The sidelink communication is performed with the second terminal using one or more SL BWPs indicated by the configuration information and in response to determining that reconfiguration of the one or more SL BWPs is necessary, a reconfiguration request message is transmitted to the base station.

17 Claims, 10 Drawing Sheets

(56) References Cited

OTHER PUBLICATIONS

3GPP, "Initial Consideration on NR V2X Resource Allocation", ZTE, 3GPP TSG-RAN WG2 103bis, R2-1814168, Oct. 8-12, 2018, 7 pages.
3GPP, Sidelink PHY Structure and Procedure for NR V2X, Huawei, HiSilicon, 3GPP TSG RAN WGI Meeting 94bis, R1-1810138, Oct. 8-12, 2018, 15 pages.
3GPP, "Sidelink Physical Layer Structure and Procedure for NR V2X", Huawei, HiSilicon, R1-1808093, 3GPP TSG RAN WGI Meeting 94 Gothenburg, Sweden, Aug. 20-24, 2018, 6 pages.

\* cited by examiner

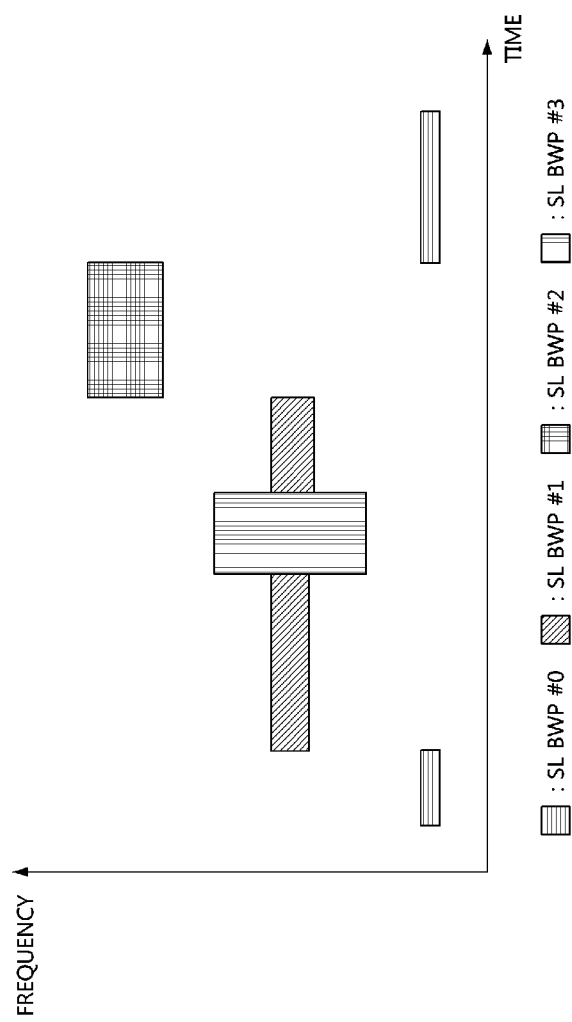

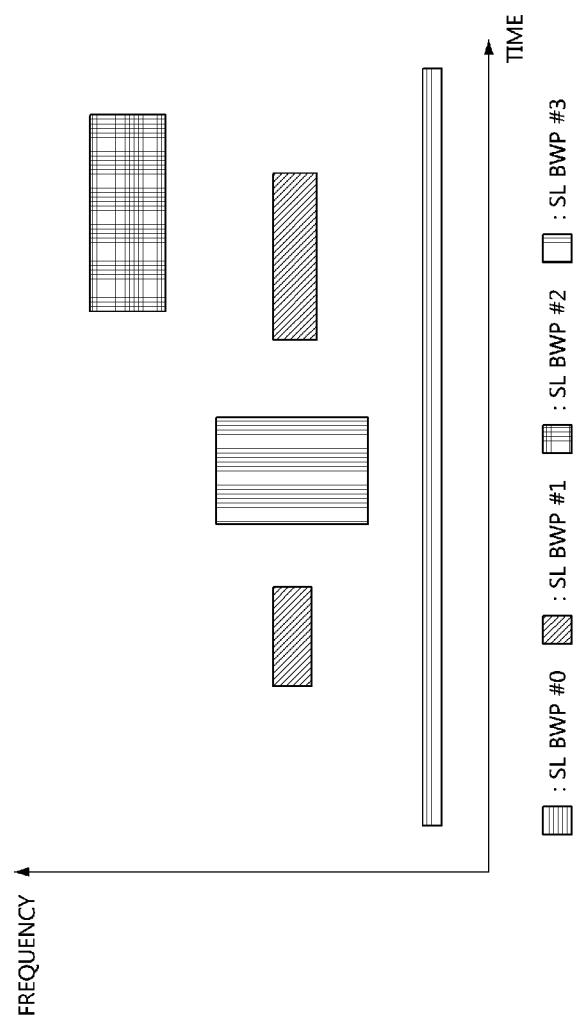

METHOD AND APPARATUS FOR RECONFIGURING BANDWIDTH PART IN SIDELINK COMMUNICATION

This application is a Continuation of U.S. application Ser. No. 16/843,357, filed Apr. 8, 2020, which claims the benefit of priority to U.S. Provisional Patent Application No. 62/832,044 filed on Apr. 10, 2019 and Korean Patent Application No. 10-2020-0033421 filed on Mar. 18, 2020, the entire contents of which are incorporated herein by reference.

BACKGROUND

1. Technical Field

The present disclosure relates generally to sidelink communication techniques, and more specifically, to techniques for reconfiguring a bandwidth part (BWP) for sidelink communication.

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system is capable of supporting Enhanced Mobile Broadband (eMBB) communications, Ultra-Reliable and Low-Latency communications (URLLC), massive Machine Type Communications (mMTC), and the like.

The 4G communication system and 5G communication system are capable of supporting Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

Meanwhile, one or more bandwidth parts (BWPs) may be configured within a system bandwidth in the NR communication system, and communications between a base station and a terminal may be performed within a BWP (e.g., an active BWP). The BWP may be classified into a downlink (DL) BWP for DL communications and an uplink (UL) BWP for UL communications. The maximum number of DL BWPs and UL BWPs configurable within the system bandwidth may be four, respectively. One BWP may include consecutive resource block(s) (RB(s)) in the frequency domain, and one subcarrier spacing may be used in one BWP. Only one BWP (e.g., DL BWP, UL BWP) may be activated in a specific time period. However, BWPs are not used in the sidelink communication, and methods for reconfiguring the BWP for sidelink communication are required.

SUMMARY

Accordingly, the present disclosure provides a method and an apparatus for reconfiguring a BWP for sidelink communication. In accordance with exemplary embodiments of the present disclosure, an operation method of a first terminal in a communication system may include transmitting, to a base station, a configuration request message requesting configuration of a sidelink (SL) bandwidth part (BWP) used for sidelink communication between the first terminal and a second terminal; receiving a configuration information message including configuration information of the SL BWP from the base station; performing the sidelink communication with the second terminal using one or more SL BWPs indicated by the configuration information; and in response to determining that reconfiguration of the one or more SL BWPs is necessary, transmitting a reconfiguration request message to the base station.

The operation method may further include receiving a reconfiguration information message from the base station, the reconfiguration information message including reconfiguration information of the SL BWP; and performing the sidelink communication with the second terminal using one or more SL BWPs indicated by the reconfiguration information.

The configuration request message may include one or more among capability information of the first terminal, capability information of the second terminal, and identification information of the second terminal. The configuration information of the SL BWP may include an SL BWP list, information indicating an initial SL BWP, and a configuration mode of an active SL BWP. The SL BWP list may include one or more of a bandwidth, a subcarrier spacing, a starting resource block (RB) index, an ending RB index, an RB offset, a number of RBs, an activation time point, an activation duration, and a service type of the one or more SL BWPs.

The configuration mode may indicate a configuration mode #1, a configuration mode #2, or a configuration mode #3. In particular, and one SL BWP may be activated in a time interval when the configuration mode #1 is used; the initial SL BWP may be always activated and another SL BWP may be further activated in a time interval when the configuration mode #2 is used; and one or more SL BWPs may be activated in a time interval when the configuration mode #3 is used. When there is no SL BWP satisfying requirement of the first terminal in the SL BWP list, the reconfiguration of the one or more SL BWPs may be determined to be necessary.

The performing of the sidelink communication may include performing the sidelink communication with the second terminal using a first SL BWP activated among a plurality of SL BWPs indicated by the configuration information; in response to determining that switching of the active SL BWP or addition of a new active SL BWP is required, selecting a second SL BWP from the plurality of SL BWPs; transmitting sidelink control information (SCI) including information indicating the second SL BWP to the second terminal; and performing the sidelink communication with the second terminal using the second SL BWP or using both the first SL BWP and the second SL BWP.

The performing of the sidelink communication may include performing the sidelink communication with the second terminal using a first SL BWP activated among a plurality of SL BWPs indicated by the configuration information; in response to determining that switching of the active SL BWP or addition of a new active SL BWP is required, transmitting information for requesting switching of the active SL BWP or addition of a new active SL BWP to the base station; receiving, from the base station, information indicating a second SL BWP selected by the base station among the plurality of SL BWPs; and performing the sidelink communication with the second terminal using the second SL BWP or using both the first SL BWP and the second SL BWP.

Furthermore, in accordance with exemplary embodiments of the present disclosure, an operation method of a base station in a communication system may include receiving, from a first terminal, a configuration request message requesting configuration of a sidelink (SL) bandwidth part (BWP) used for sidelink communication between the first terminal and a second terminal; configuring a plurality of SL BWPs used for the sidelink communication; transmitting a configuration information message including configuration information of the plurality of SL BWPs to the first terminal and the second terminal; receiving a reconfiguration request message for requesting reconfiguration of the SL BWP from the first terminal; reconfiguring one or more new SL BWPs that meet requirements of the first terminal; and transmitting a reconfiguration information message including reconfiguration information of the one or more new SL BWPs to the first terminal and the second terminal.

The configuration request message may include one or more among capability information of the first terminal, capability information of the second terminal, and identification information of the second terminal. The configuration information of the plurality of SL BWPs may include an SL BWP list, information indicating an initial SL BWP, and a configuration mode of an active SL BWP. The SL BWP list may include one or more among a bandwidth, a subcarrier spacing, a starting resource block (RB) index, an ending RB index, an RB offset, a number of RBs, an activation time point, an activation duration, and a service type of the one or more SL BWPs.

The configuration mode may indicate a configuration mode #1, a configuration mode #2, or a configuration mode #3. In particular, one SL BWP may be activated in a time interval when the configuration mode #1 is used; the initial SL BWP may be always activated and another SL BWP may be further activated in a time interval when the configuration mode #2 is used; and one or more SL BWPs may be activated in a time interval when the configuration mode #3 is used. When there is no SL BWP satisfying requirement of the first terminal in the SL BWP list, the reconfiguration of the SL BWP may be requested.

Furthermore, in accordance with exemplary embodiments of the present disclosure, a first terminal in a communication system may include a processor and a memory configured to store at least one instruction executable by the processor. The at least one instruction causes the processor to: transmit, to a base station, a configuration request message requesting configuration of a sidelink (SL) bandwidth part (BWP) used for sidelink communication between the first terminal and a second terminal; receive a configuration information message including configuration information of the SL BWP from the base station; perform the sidelink communication with the second terminal using one or more SL BWPs indicated by the configuration information; in response to determining that reconfiguration of the one or more SL BWPs is necessary, transmit a reconfiguration request message to the base station; receive a reconfiguration information message from the base station, the reconfiguration information message including reconfiguration information of the SL BWP; and perform the sidelink communication with the second terminal using one or more SL BWPs indicated by the reconfiguration information.

The configuration request message may include one or more among capability information of the first terminal, capability information of the second terminal, and identification information of the second terminal. The configuration information of the SL BWP may include an SL BWP list, information indicating an initial SL BWP, and a configuration mode of an active SL BWP. The SL BWP list may include one or more of a bandwidth, a subcarrier spacing, a starting resource block (RB) index, an ending RB index, an RB offset, a number of RBs, an activation time point, an activation duration, and a service type of the one or more SL BWPs.

In the performing of the sidelink communication, the processor may be configured to: perform the sidelink communication with the second terminal using a first SL BWP activated among a plurality of SL BWPs indicated by the configuration information; in response to determining that switching of the active SL BWP or addition of a new active SL BWP is required, select a second SL BWP from the plurality of SL BWPs; transmit sidelink control information (SCI) including information indicating the second SL BWP to the second terminal; and perform the sidelink communication with the second terminal using the second SL BWP or using both the first SL BWP and the second SL BWP.

According to the exemplary embodiments of the present disclosure, an SL BWP for SL communication between terminals may be configured. The terminals may be configured to perform SL communication within the SL BWP. The SL communication may be performed in a unicast scheme within the SL BWP. In particular, interferences caused by the SL communication may be reduced. In addition, a time required for performing a beam measurement operation, a beam update operation, a beam recovery operation, and the like may be reduced. The base station may be configured to configure a plurality of SL BWPs, and transmit configuration information of the plurality of SL BWPs to the terminals.

The terminals may be configured to perform sidelink communication using one or more SL BWPs among the plurality of SL BWPs configured by the base station. When the plurality of SL BWPs configured by the base station does not meet the requirements of the terminal(s), the terminal(s) may be configured to transmit a message requesting reconfiguration of the SL BWP to the base station. The base station may be configured to reconfigure the SL BWP according to the request of the terminal(s), and transmit reconfiguration information of the SL BWP to the terminals. The terminals may be configured to perform sidelink communication using the SL BWP reconfigured by the base station. Accordingly, sidelink resources may be used more efficiently, and the performance of the communication system may be improved.

BRIEF DESCRIPTION OF DRAWINGS

The present disclosure will become more apparent by describing in detail exemplary embodiments of the present disclosure with reference to the accompanying drawings, in which:

FIG. 9A is a conceptual diagram illustrating an exemplary embodiment of an active SL BWP according to a configuration mode #1 in a communication system;

FIG. 9B is a conceptual diagram illustrating an exemplary embodiment of an active SL BWP according to a configuration mode #2 in a communication system.

Figure 1:
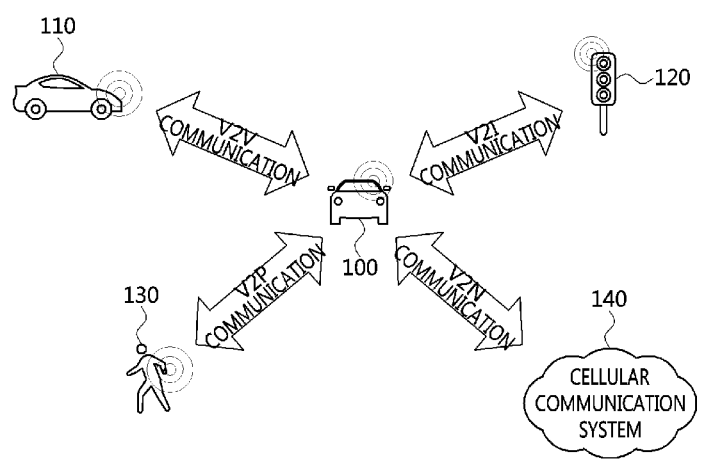
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or controller may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." In particular, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located within the vehicle 100) and an infrastructure (e.g., road side unit (RSU)) 120 located along a road. The infrastructure 120 may also include a traffic light or a street light also located along the road. For example, when the V2I communications are performed, the communications may be performed between the communication node disposed within the first vehicle 100 and a communication node disposed within a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node disposed within the vehicle 100 or the communication node carried by the person 130 may be configured to generate an alarm that provides an indication regarding a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node disposed within the vehicle 100 and the communication node carried by the person 130 may be performed using at least one sidelink channel established between the communication nodes.

The V2N communications may be communications between the first vehicle 100 (e.g., the communication node located within the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
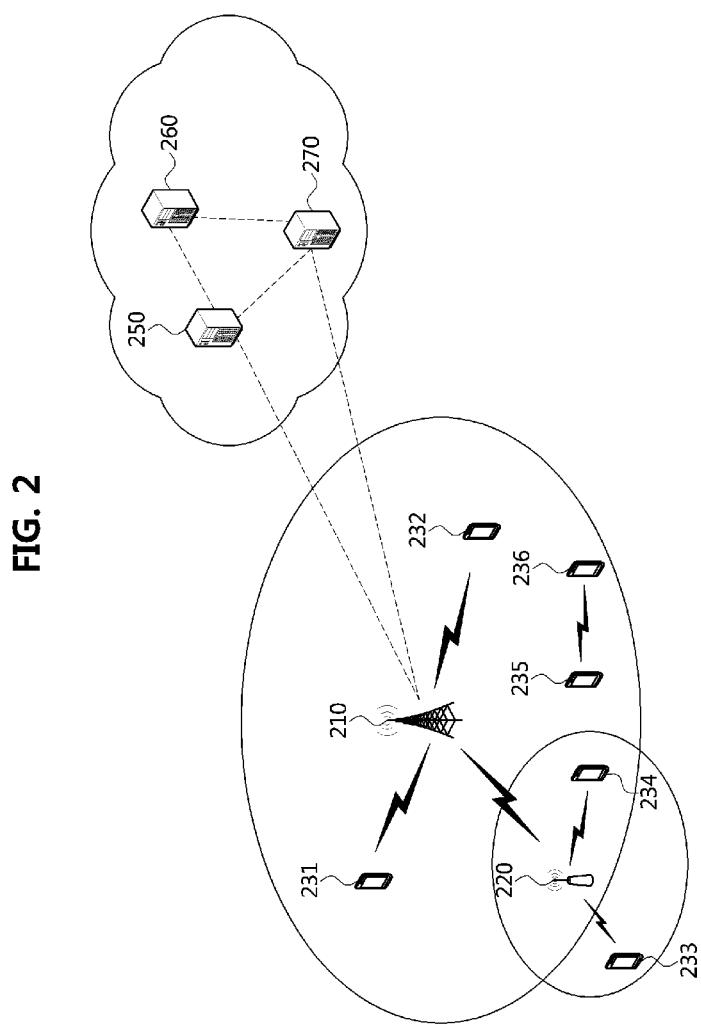
FIG. 2 is a conceptual diagram illustrating exemplary embodiments of a cellular communication system.

Meanwhile, the cellular communication system 140 that supports the V2X communications may be configured as follows. FIG. 2 is a conceptual diagram illustrating exemplary embodiments of a cellular communication system. As shown in FIG. 2, a cellular communication system may include an access network, a core network, and the like. The access network may include a base station 210, a relay 220, user equipment (UEs) 231 through 236, and the like. The UEs 231 through 236 may include communication nodes disposed within the vehicles 100 and 110 of FIG. 1, the communication node disposed within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

When the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported via the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology. The communication nodes (e.g., base station, relay, UE, S-GW, P-GW, MME, UPF, SMF, AMF, etc.) including the cellular communication system may be configured as follows.

Figure 3:
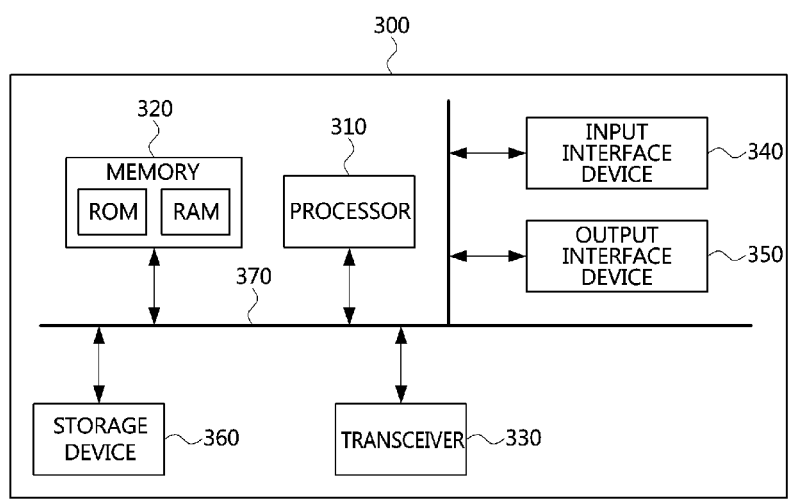
FIG. 3 is a conceptual diagram illustrating exemplary embodiments of a communication node forming a cellular communication system.

FIG. 3 is a conceptual diagram illustrating exemplary embodiments of a communication node forming a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface. The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may be part of cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may be part of both of the cell coverage of the base station 210 and the cell coverage of the relay 220, and the UE 233 may be part of the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations that correspond to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node disposed within the first vehicle 100 of FIG. 1 and the UE 236 may be the communication node disposed within the second vehicle 110 of FIG. 1. When V2I communications are performed using the sidelink communication technique, the UE 235 may be the communication node disposed within first vehicle 100 of FIG. 1 and the UE 236 may be the communication node disposed within the infrastructure 120 of FIG. 1. When V2P communications are performed using the sidelink communication technique, the UE 235 may be the communication node disposed within first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
|---|---|---|
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
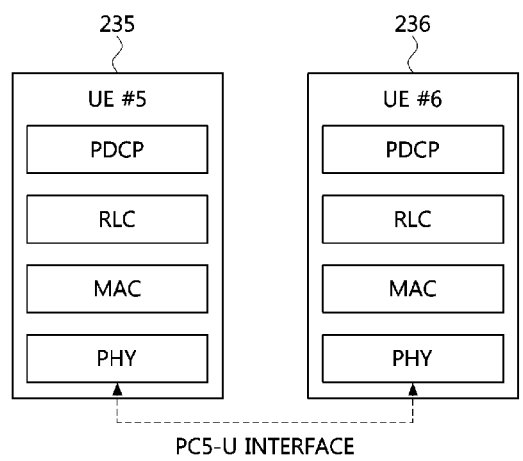
FIG. 4 is a block diagram illustrating exemplary embodiments of a user plane protocol stack of an UE performing sidelink communication.

Meanwhile, a user plane protocol stack of the UEs (e.g., the UEs 235 and 236) performing sidelink communications may be configured as follows. FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
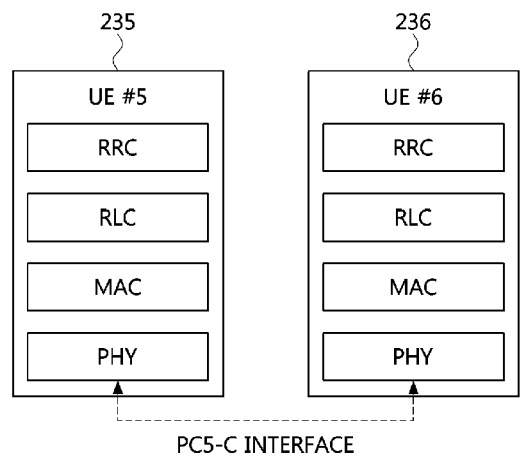
FIG. 5 is a block diagram illustrating a first exemplary embodiment of a control plane protocol stack of an UE performing sidelink communication.
Figure 6:
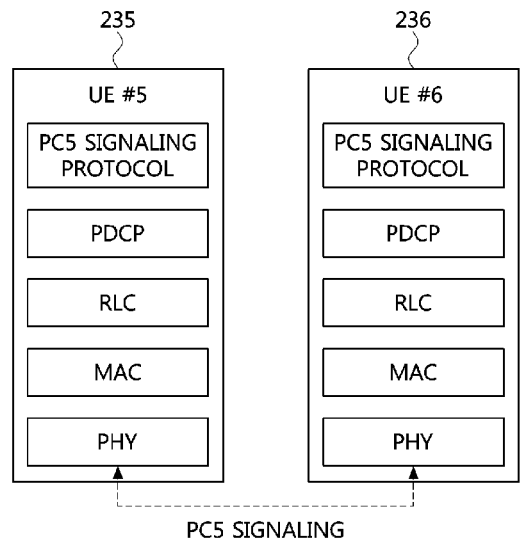
FIG. 6 is a block diagram illustrating a second exemplary embodiment of a control plane protocol stack of an UE performing sidelink communication.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure.

In particular, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted via resources selected automatically by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. The sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. In particular, the sidelink data may be transmitted and received via resources selected automatically by the UE (e.g., UE 235 or 236) within the resource pool configured by the dedicated RRC signaling procedure or the broadcast RRC signaling procedure.

Hereinafter, methods for reconfiguring a bandwidth part (BWP) in sidelink communication will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a first vehicle is described, a corresponding second vehicle may be configured to perform an operation that corresponds to the operation of the first vehicle. Conversely, when an operation of the second vehicle is described, the corresponding first vehicle may be configured to perform an operation that corresponds to the operation of the second vehicle. In the exemplary embodiments described below, the operation of the vehicle may be the operation of the communication node located in the vehicle.

Figure 7A:
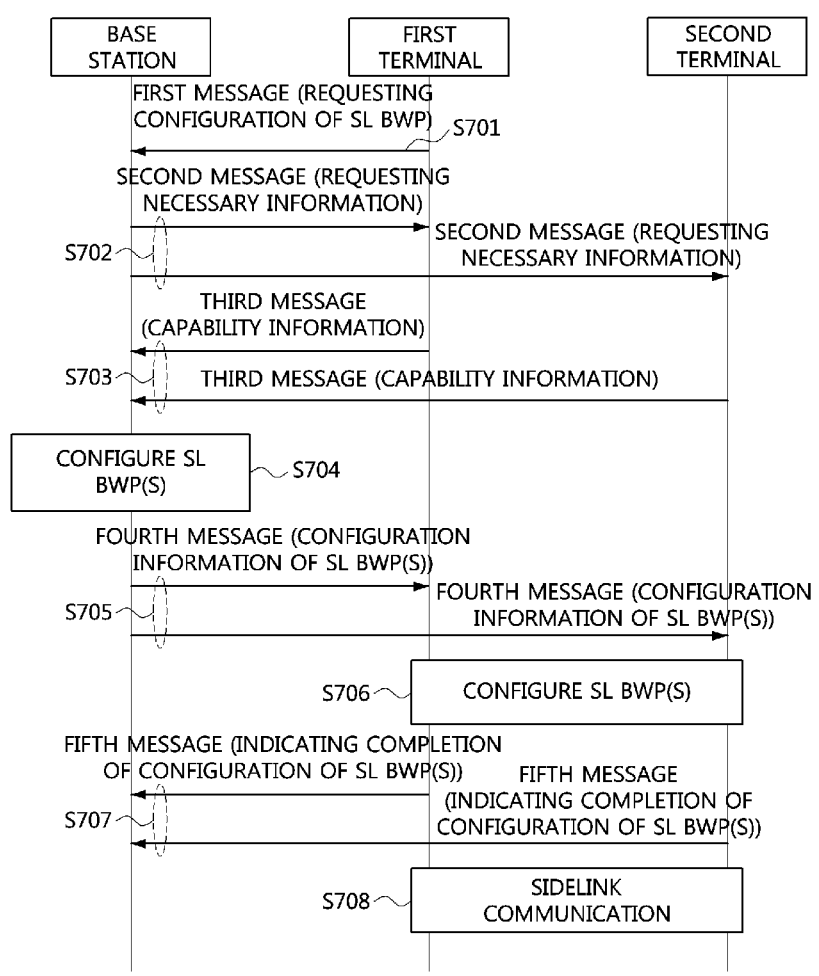
FIG. 7A is a sequence chart illustrating a first exemplary embodiment of a BWP reconfiguration method for sidelink communication.
Figure 7B:
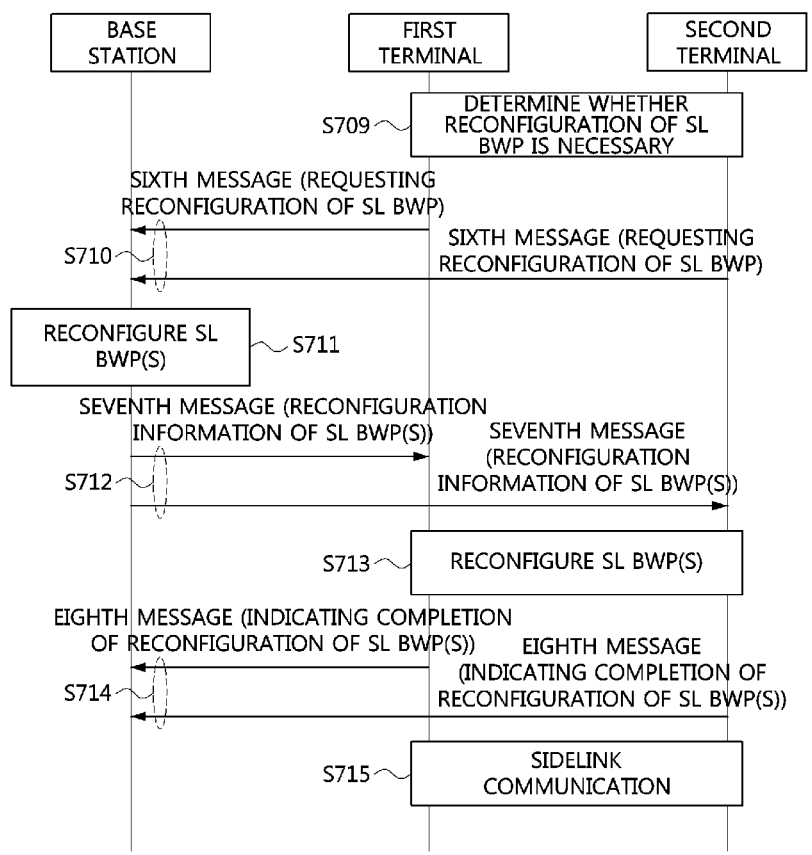
FIG. 7B is a sequence chart illustrating a second exemplary embodiment of a BWP reconfiguration method for sidelink communication.

FIG. 7A is a sequence chart illustrating a first exemplary embodiment of a BWP reconfiguration method for sidelink communication, and FIG. 7B is a sequence chart illustrating a second exemplary embodiment of a BWP reconfiguration method for sidelink communication.

As shown in FIGS. 7A and 7B, a communication system may include a base station, a first terminal, a second terminal, and the like. One or more terminals among the first terminal and the second terminal may be within cell coverage of the base station. An RRC connection between the first terminal and the base station may be established, and an RRC connection between the second terminal and the base station may be established. For example, the base station may be the base station 210 shown in FIG. 1, the first terminal may be the UE 235 shown in FIG. 1, and the second terminal may be the UE 236 shown in FIG. 1. Each of the base station, the first terminal, and the second terminal may be configured identically or similarly to the communication node 300 shown in FIG. 3. The first terminal and the second terminal may support the protocol stacks shown in FIGS. 4 to 6.

Sidelink communication may be performed between the first terminal and the second terminal. In particular, the first terminal may be configured to generate a first message for requesting configuration of a BWP (hereinafter, referred to as sidelink (SL) BWP') for sidelink communication, and may be configured to transmit the first message to the base station (S701). The first message may be referred to as 'configuration request message'. The first message may include an identifier (e.g., layer 2 identifier (ID)) of the second terminal performing the sidelink communication with the first terminal. A V2X layer (e.g., entity performing a V2X function) of the first terminal may be configured to deliver the layer 2 ID of the second terminal to an RRC layer (e.g., entity performing an RRC function) of the first terminal. The RRC layer of the first terminal may be configured to generate the first message including the layer 2 ID of the second terminal.

Particularly, the first message for requesting the configuration of the SL BWP may be an RRC message, a MAC message, or a physical (PHY) message. The RRC message may be a higher layer message, and the MAC message may be a MAC control element (CE). The PHY message may be downlink control information (DCI) or uplink control information (UCI). The first message for requesting the configuration of the SL BWP may be SL UE information. The SL UE information may include service-related information, an identifier of the second terminal, and the like. When the base station has previously recognized the second terminal performing the sidelink communication with the first terminal, the step S701 may be omitted.

The base station may be configured to receive the first message from the first terminal, and determine the identifier of the second terminal included in the first message. In particular, the base station may be configured to determine that the configuration of the SL BWP for sidelink communication between the first terminal and the second terminal has been requested. The base station may be configured to transmit a second message requesting information required for configuring the SL BWP to one or more terminals among the first terminal and the second terminal (S702). The second message may be referred to as 'information request message'. The second message may be an RRC message, a MAC message, or a PHY message.

When the information needed for configuring the SL BWP is present in the base station, the base station may not transmit the second message. The base station may be configured to obtain capability information of the terminal(s) in a connection configuration procedure. When the capability information of the first terminal is present in the base station, the base station may not transmit the second message to the first terminal. Additionally, when the capability information of the second terminal is present in the base station, the base station may not transmit the second message to the second terminal. When the capability information of both the first terminal and the second terminal are present in the base station, the step S702 may be omitted.

The capability information may include information regarding a frequency (e.g., frequency range, operating frequency band, frequency range 1 (FR1), FR2, etc.), information regarding a fast Fourier transform (FFT) (e.g., FFT size), information regarding a maximum transmission power, quality information (e.g., quality of service (QoS), packet error rate, packet delay budget, etc.) and size of data to be transmitted through sidelink communication, and the like, which are supported by the terminal. FR1 may be a frequency band of 6 GHz or below, and FR2 may be a frequency band of 24.25 GHz to 52.6 GHz.

The first terminal and the second terminal may be configured to receive the second message from the base station. Each of the first terminal and the second terminal may be configured to transmit a third message including capability information thereof to the base station (S703). The third message may be referred to as 'information response message'. When the first terminal knows the capability information of the second terminal, the third message transmitted from the first terminal may include the capability information of the second terminal as well as the capability information of the first terminal.

Alternatively, the capability information of the first terminal, the capability information of the second terminal, or the capability information of both the first terminal and the second terminal may be included in the first message of the step S701. In particular, the step S702 and step S703 may be omitted. The third message may be an RRC message, a MAC message, or a PHY message. The base station may be configured to obtain the capability information of the first terminal or the capability information of both the first terminal and the second terminal by receiving the third message from the first terminal. In addition, the base station may be configured to obtain the capability information of the second terminal by receiving the third message from the second terminal.

The base station may be configured to configure SL BWP(s) between the first terminal and the second terminal using the capability information of the first terminal and the capability information of the second terminal (S704). Since the capability information of the first terminal may be different from the capability information of the second terminal, the base station may consider both the capability information of the first terminal and the capability information of the second terminal to configure the SL BWP(s).

A bandwidth of the SL BWP may be less than or equal to a maximum bandwidth available for sidelink communication. The SL BWP may include one or more resource blocks (RBs) consecutive in the frequency domain. One SL BWP may have one subcarrier spacing. The SL BWP may be classified into an SL transmission (TX) BWP and an SL reception (RX) BWP. Alternatively, the SL BWP may be configured without discrimination between TX and RX. The SL TX BWP may be an SL BWP used for a transmission operation of the first terminal or the second terminal, and the SL RX BWP may be an SL BWP used for a reception operation of the first terminal or the second terminal. The maximum number of configurable SL BWPs may be predefined in the technical specification.

The size of the SL TX BWP may be configured to be equal to the size of the SL RX BWP. For example, when the size of transmission data in the first terminal is the same as the size of transmission data in the second terminal, the size of the SL TX BWP may be configured to be equal to the size of the SL RX BWP. Alternatively, the size of the SL TX BWP may be configured differently from the size of the SL RX BWP. For example, when the size of transmission data in the first terminal is greater than the size of transmission data in the second terminal, the size of the SL TX BWP for the first terminal may be greater than the size of the SL RX BWP for the second terminal. This case may correspond to when the first terminal transmits data to the second terminal, and the second terminal transmits feedback information for the data to the first terminal. The SL BWPs configured by the base station may be as follows.

Figure 8:
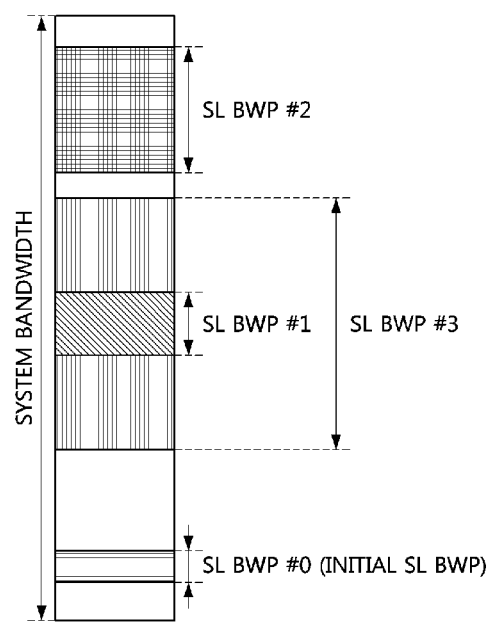
FIG. 8 is a conceptual diagram illustrating a first exemplary embodiment of SL BWPs for sidelink communication.

FIG. 8 is a conceptual diagram illustrating a first exemplary embodiment of SL BWPs for sidelink communication. As shown in FIG. 8, the base station may be configured to configure SL BWPs #0 to #3 for sidelink communication between the first terminal and the second terminal. The SL BWPs #0 to #3 may be configured within a system bandwidth. The SL BWP #0 may be an initial SL BWP. The initial SL BWP may be used as a default SL BWP. Alternatively, the initial SL BWP may be different from the default SL BWP.

For example, when the default SL BWP is the SL BWP #0, the initial SL BWP may be the SL BWP #1. The SL BWP #0 may be used for initial communication between the first terminal and the second terminal. One or more SL BWPs among the SL BWPs #0 to #3 may be activated in a specific time interval, and the sidelink communication between the first terminal and the second terminal may be performed using the active SL BWP(s).

The SL BWP #0 may be an SL BWP first activated for the sidelink communication between the first terminal and the second terminal. The active SL BWP may be switched as needed. For example, the active SL BWP may be switched based on a transmission data size, a transmission data rate, a channel quality, a latency requirement, and/or a service type (e.g., enhanced Mobile BroadBand (eMBB), Ultra-Reliable and Low-Latency Communication (URLLC), massive Machine Type Communication (mMTC), etc.). The switching of the active SL BWP may be performed under control of the base station. Alternatively, the active SL BWP may be switched by the first terminal and/or the second terminal without the control of the base station.

The SL BWPs #0 to #3 may be configured within the same carrier. Alternatively, the SL BWPs #0 to #3 may be configured in different carriers. For example, the SL BWP #0 may be configured within a carrier #0, the SL BWPs #1 and #3 may be configured within a carrier #1, and the SL BWP #2 may be configured within a carrier #2. To support this operation, the base station, the first terminal, and the second terminal may support a carrier aggregation (CA) function.

Meanwhile, a configuration mode of the active SL BWP may be defined as shown in Table 3 below.

TABLE 3

| | Description |
|---|---|
| Configuration mode #1 | One SL BWP is activated in a specific time interval. |
| Configuration mode #2 | An initial SL BWP is always configured as an active SL BWP, and other SL BWP(s) are further configured as active SL BWP(s). That is, one or more SL BWPs may be activated in a specific time interval. |
| Configuration mode #3 | One or more SL BWPs may be activated in a specific time interval. An initial SL BWP may not be always configured as an active SL BWP. |

When the configuration mode #1 is used, the active SL BWP may be configured as follows. Notably, the configuration modes may also be referred to as a first configuration mode (#1), a second configuration mode (#2), and a third configuration mode (#3).

FIG. 9A is a conceptual diagram illustrating an exemplary embodiment of an active SL BWP according to a configuration mode #1 in a communication system. As shown in FIG. 9A, one SL BWP may be activated in a specific time interval. The activation order of the SL BWPs may be 'SL BWP #0→SL BWP #1→SL BWP #3→SL BWP #1→SL BWP #2→SL BWP #0'.

FIG. 9B is a conceptual diagram illustrating an exemplary embodiment of an active SL BWP according to a configuration mode #2 in a communication system. As shown in FIG. 9B, the SL BWP #0, which is the initial SL BWP, may always be configured as an active SL BWP. Two or more SL BWPs may be activated in a specific time interval. For example, there may be a time interval in which the SL BWPs #0 and #1 are activated at the same time, there may be a time interval in which the SL BWPs #0 and #3 are activated at the same time, and there may be a time interval in which the SL BWPs #0, #1, and #2 are activated at the same time.

Figure 9C:
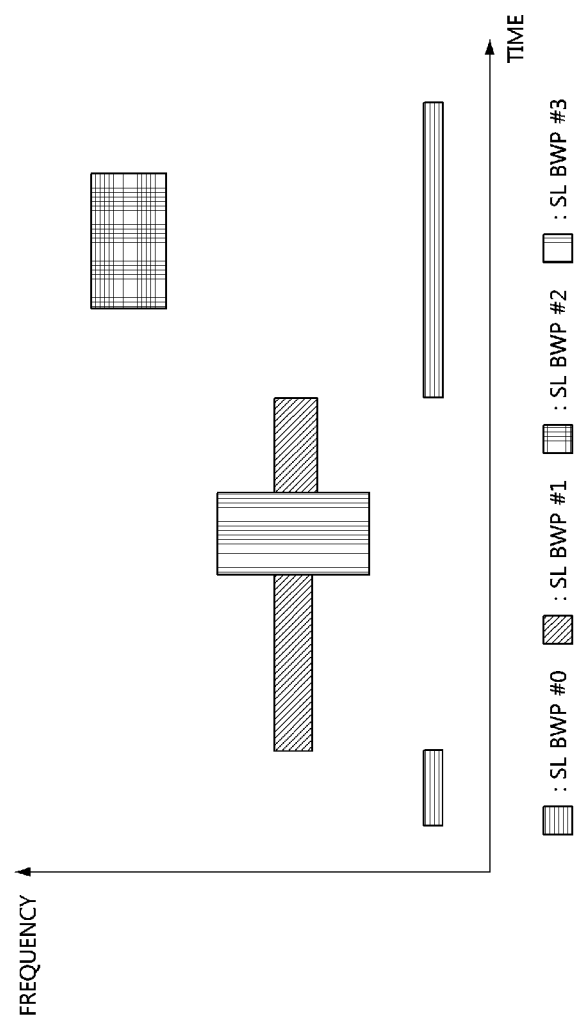
FIG. 9C is a conceptual diagram illustrating an exemplary embodiment of an active SL BWP according to a configuration mode #3 in a communication system.

FIG. 9C is a conceptual diagram illustrating an exemplary embodiment of an active SL BWP according to a configuration mode #3 in a communication system. As shown in FIG. 9C, one or more SL BWPs may be activated in a specific time interval. For example, there may be a time interval in which the SL BWPs #0 and #2 are activated at the same time.

Referring back to FIGS. 7A and 7B, the base station may be configured to generate a fourth message including configuration information of the SL BWP(s), and transmit the fourth message to the first terminal and the second terminal (S705). The fourth message may be referred to as 'configuration information message'. The fourth message may be an RRC message, a MAC message, or a PHY message. The configuration information of the SL BWP(s) may include one or more among an SL BWP list (i.e., a list of the SL BWP(s)), information indicating an initial SL BWP, and a configuration mode (e.g., configuration modes #1, #2, or #3) of an active SL BWP. When the SL BWPs #0 to #3 are configured, the SL BWP list may be configured as shown in Table 4 below.

In Table 4, s0 to s3 may indicate different starting RBs or the same starting RB. Particularly, e0 to e3 may indicate different ending RBs or the same ending RB. In addition, o0 to o3 may indicate different RB offsets or the same RB offset and n0 to n3 may indicate different numbers of RBs or the same number of RBs. Further, t0 to t3 may indicate different activation time points or the same activation time point, d0 to d3 may indicate different activation durations or the same activation duration, and st0 to st3 may indicate different service types or the same service type.

TABLE 4

| SL BWP index | bandwidth | SCS (kHz) | Starting RB index | Ending RB index | RB offset | Number of RBs | Activation time point | Activation duration | Service type |
|---|---|---|---|---|---|---|---|---|---|
| #0 | 20 MHz | 15 | s0 | e0 | o0 | n0 | t0 | d0 | st0 |
| #1 | 40 MHz | 15 | s1 | e1 | o1 | n1 | t1 | d1 | st1 |
| #2 | 80 MHz | 30 | s2 | e2 | o2 | n2 | t2 | d2 | st2 |
| #3 | 160 MHz | 15 | s3 | e3 | o3 | n3 | t3 | d3 | st3 |

The SL BWP list may include one or more among a bandwidth, a subcarrier spacing, a starting RB index, an ending RB index, an RB offset, number of RBs, an activation time point, an activation duration, and a service type (e.g., eMBB, URLLC, mMTC). The starting RB index may indicate an RB having the lowest frequency among RBs constituting the SL BWP. The ending RB index may indicate an RB having the highest frequency among the RBs constituting the SL BWP. The RB offset may be an offset from a reference RB to the starting RB or ending RB of the SL BWP. The number of RBs may indicate the number of the RBs constituting the SL BWP.

The activation time point may indicate a time point when the SL BWP is activated. In addition, the activation time point may refer to a switching time point between active SL BWPs. The activation time point may be indicated by a subframe index, slot index, and/or symbol index. Alternatively, the activation time point may be an offset from a reference time point. For example, the reference time point may be a reception time point of the fourth message. The activation duration may indicate a time interval for which the SL BWP is activated. The activation duration may start from the activation time point.

The information indicating the initial SL BWP may be an SL BWP index. When the SL BWP #0 is defined to be used as the initial SL BWP, the initial SL BWP may be identified based on the information included in the SL BWP list (e.g., SL BWP index). Therefore, the fourth message including the SL BWP list may not further include the information indicating the initial SL BWP. In other words, the first terminal and the second terminal may be configured to determine the SL BWP #0 as the initial SL BWP in the SL BWP list.

The first terminal and the second terminal may be configured to receive the fourth message from the base station, and identify the configuration information of the SL BWP included in the fourth message (e.g., SL BWP list, information indicating the initial SL BWP, and/or configuration mode of the active SL BWP). The first terminal and the second terminal may be configured to configure the SL BWP(s) based on the configuration information of the SL BWP included in the fourth message (S706). When the configuration of the SL BWP(s) is completed, each of the first terminal and the second terminal may be configured to transmit a fifth message indicating that the configuration of the SL BWP (s) has been completed (S707). The fifth message may be referred to as 'configuration complete message'. When the fifth message is received from the first terminal and the second terminal, the base station may be configured to determine that the configuration of the SL BWP(s) has been completed in the first terminal and the second terminal. The fifth message may be an RRC message, a MAC message, or a PHY message. In this case, the step S707 may be omitted.

Further, the first terminal and the second terminal may be configured to perform sidelink communication using the SL BWP(s) configured by the base station (S708). The sidelink communication between the first terminal and the second terminal may be performed using the initial SL BWP (e.g., SL BWP #0). In addition, the sidelink communication between the first terminal and the second terminal may be performed according to the configuration mode #1, #2, or #3.

Meanwhile, switching of the active SL BWP or addition of a new active SL BWP may be required according to the channel quality, the transmission data size, the data transmission rate, the delay requirement, the service type, etc. between the first terminal and the second terminal. In response to determining that the switching of the active SL BWP or the addition of a new active SL BWP is required, the first terminal (or second terminal) may be configured to select another SL BWP(s) other than the currently active SL BWP from the SL BWP list. The first terminal (or second terminal) may be configured to transmit a message including information (e.g., SL BWP index) indicating the selected SL BWP(s) to the second terminal (or first terminal). Particularly, the message may be sidelink control information (SCI). The message may further include information indicating an activation time point of the selected SL BWP(s) as well as the information indicating the selected SL BWP(s).

The second terminal may be configured to obtain the information indicating the SL BWP other than the currently active SL BWP and/or information indicating the activation time point based on the message received from the first terminal. When the configuration mode #1 defined in Table 3 is used, the first terminal and the second terminal may be configured to switch the active SL BWP to the SL BWP selected by the first terminal, and perform sidelink communication in the switched SL BWP.

When the configuration modes #2 and #3 defined in Table 3 are used, the first terminal and the second terminal may be configured to configure the SL BWP(s) selected by the first terminal as new active SL BWP(s), and perform sidelink communication using the plurality of active SL BWPs.

Alternatively, when the configuration modes #2 and #3 defined in Table 3 are used, the first terminal and the second terminal may be configured to switch the active SL BWP to the SL BWP selected by the first terminal, and perform sidelink communication in the switched SL BWP.

Alternatively, in response to determining that the switching of the active SL BWP or the addition of a new active SL BWP is required, the first terminal (or second terminal) may be configured to transmit a message requesting the switching of the active SL BWP or the addition of a new active SL BWP to the base station. The base station may be configured to determine that the switching of the active SL BWP or the addition of a new active SL BWP is required based on the message received from the first terminal (or the second terminal).

Accordingly, the base station may be configured to select another SL BWP(s) other than the currently active SL BWP from the SL BWP list. The base station may be configured to transmit a message (e.g., RRC message, MAC message, or PHY message) including information indicating the selected SL BWP(s) and information indicating an activation time point of the selected SL BWP(s) to the first terminal and the second terminal. The first terminal and the second terminal may be configured to perform an operation of switching the active SL BWP or an operation of adding a new active SL BWP based on the message received from the base station.

Alternatively, the base station may be configured to transmit the message including the information indicating the selected SL BWP(s) and information indicating the activation time point of the selected SL BWP(s) only to the first terminal. In particular, the first terminal may be configured to transmit SCI including the information indicating the selected SL BWP(s) and the information indicating the activation time point of the selected SL BWP(s) to the second terminal. Accordingly, the first terminal and the second terminal may be configured to perform sidelink communication using the SL BWP(s) selected by the base station.

Although the above-described operation of switching the active SL BWP and operation of adding a new active SL BWP have been described as being performed at the initiative of the first terminal, the second terminal instead of the first terminal may mainly perform the operation of switching the active SL BWP and the operation of adding a new active SL BWP. For example, the second terminal may select another SL BWP(s) other than the currently active SL BWP from the SL BWP list.

Meanwhile, when the switching of the active SL BWP or addition of a new active SL BWP is required according to the channel quality, the transmission data size, the data transmission rate, the delay requirement, the service type, etc., an SL BWP required by the first terminal and/or the second terminal may not exist in the SL BWP list configured by the base station. In particular, the first terminal and/or the second terminal may be configured to determine that the SL BWP (e.g., SL BWP list) requires reconfiguration. The first terminal and/or the second terminal may be configured to periodically determine whether the SL BWP (e.g., SL BWP list) requires reconfiguration (S709).

Alternatively, when a specific event occurs, the first terminal and/or the second terminal may be configured to determine whether the SL BWP (e.g., SL BWP list) requires reconfiguration (S709). For example, when an SL BWP that supports a data transmission rate required by the terminal, an SL BWP that meets a delay requirement required by the terminal, or an SL BWP that supports a service required by the terminal does not exist in the SL BWP list, the first terminal and/or the second terminal may be configured to determine that the SL BWP (e.g., SL BWP list) requires reconfiguration.

The first terminal and/or the second terminal may be configured to transmit a sixth message requesting reconfiguration of the SL BWP (e.g., SL BWP list) to the base station (S710). The sixth message may be referred to as 'reconfiguration request message'. The sixth message may be an RRC message, a MAC message, or a PHY message. The sixth message may include characteristic information of the SL BWP required by the first terminal and/or the second terminal. The characteristic information of the SL BWP may include one or more among a bandwidth, a subcarrier spacing, a starting RB index, an ending RB index, an RB offset, number of RBs, an activation time point, an activation duration, a service type, a channel quality, a transmission data size, a data transmission rate, and a delay requirement. In addition, the sixth message may include a reason for the reconfiguration request for the SL BWP (e.g., SL BWP list). The reason for the reconfiguration request for the SL BWP (e.g., SL BWP list) may be a change in the transmission data rate, the delay requirement, the service type, or the like.

The base station may be configured to receive the sixth message from the first terminal and/or the second terminal. In response to receiving the sixth message, the base station may be configured to determine that the reconfiguration of the SL BWP (e.g., SL BWP list) has been requested. Particularly, the base station may be configured to determine whether the reconfiguration of the SL BWP (e.g., SL BWP list) is allowed based on the information included in the sixth message. When the reconfiguration of the SL BWP (e.g., SL BWP list) is not allowed, the base station may be configured to transmit a message indicating that the reconfiguration of the SL BWP (e.g., SL BWP list) is not allowed to the first terminal and/or the second terminal.

In response to receiving the message indicating that the reconfiguration of the SL BWP (e.g., SL BWP list) is not allowed, the first terminal and the second terminal may be configured to continue to perform sidelink communication using the SL BWP(s) belonging to the existing SL BWP list (i.e., the SL BWP list configured in the step S704). Alternatively, in response to receiving the message indicating that the reconfiguration of the SL BWP (e.g., SL BWP list) is not allowed, the first terminal and the second terminal may be configured to terminate the sidelink communication.

In response to determining that the reconfiguration of the SL BWP (e.g., SL BWP list) is allowed, the base station may be configured to reconfigure the SL BWP(s) based on the characteristic information of the SL BWP required by the terminal(s) and/or the reason for the reconfiguration request for the SL BWP (e.g., SL BWP list) (S711). For example, the base station may be configured to reconfigure the SL BWP(s) corresponding to the characteristic information of the SL BWP required by the terminal(s).

Further, the base station may be configured to generate a seventh message including reconfiguration information of the SL BWP(s), and transmit the seventh message to the first terminal and the second terminal (S712). The seventh message may be referred to as 'reconfiguration information message'. The seventh message may be an RRC message, a MAC message, or a PHY message. The reconfiguration information of the SL BWP(s) may include one or more among an SL BWP list, information indicating an initial SL BWP, and a configuration mode (e.g., configuration mode #1, #2, or #3) of an active SL BWP. The SL BWP list included in the reconfiguration information of the SL BWP(s) may be configured similarly to Table 4. For example, the SL BWP list may further include new SL BWPs (e.g., SL BWPs #4 to #6) compared to the existing SL BWP listed in Table 4. Alternatively, the SL BWP list may include SL BWPs (e.g., SL BWPs #4 to #6) different from the existing SL BWPs described in Table 4.

The first terminal and the second terminal may be configured to receive the seventh message from the base station, and identify the reconfiguration information of the SL BWP included in the seventh message (e.g., SL BWP list, information indicating the initial SL BWP, and/or configuration mode of the active SL BWP). The first terminal and the second terminal may be configured to reconfigure the SL BWP(s) based on the reconfiguration information of the SL BWP included in the seventh message (S713). When the reconfiguration of the SL BWP(s) is completed, each of the first terminal and the second terminal may be configured to transmit an eighth message indicating that the reconfiguration of the SL BWP(s) has been completed (S714). The eighth message may be referred to as 'reconfiguration complete message'. In response to receiving the eighth message from the first terminal and the second terminal, the base station may be configured to determine that the reconfiguration of the SL BWP(s) has been completed in the first terminal and the second terminal. The eighth message may be an RRC message, a MAC message, or a PHY message. Particularly, the step S714 may be omitted.

The first terminal and the second terminal may be configured to perform sidelink communication using the SL BWP(s) reconfigured by the base station (S715). The sidelink communication between the first terminal and the second terminal may be performed using the initial SL BWP (e.g., SL BWP #0). For example, the sidelink communication between the first terminal and the second terminal may be performed according to the configuration mode #1, #2, or #3. The first terminal and/or the second terminal may be configured to determine whether the SL BWP requires reconfiguration by performing the step S709 during the sidelink communication. When the reconfiguration of the SL BWP is required, the reconfiguration procedure of the SL BWP (e.g., the steps S710 to S714) may be performed. When the reconfiguration of the SL BWP is not necessary, the sidelink communication may be performed without performing the reconfiguration procedure of the SL BWP.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first terminal in a communication system, comprising:
   transmitting, by a processor, to a base station, a configuration request message requesting configuration of a sidelink (SL) bandwidth part (BWP) used for sidelink communication between the first terminal and a second terminal;
   receiving, by the processor, a configuration information message including configuration information of the SL BWP from the base station;
   performing, by the processor, the sidelink communication with the second terminal using one or more SL BWPs indicated by the configuration information; and
   in response to determining that reconfiguration of the one or more SL BWPs is necessary, transmitting, by the processor, a reconfiguration request message to the base station,
   wherein the configuration information of the SL BWP includes an SL BWP list, and the SL BWP list includes a bandwidth, a subcarrier spacing, resource block (RB) information, and activation information.

2. The operation method according to claim 1, further comprising:
   receiving, by the processor, a reconfiguration information message from the base station, the reconfiguration information message including reconfiguration information of the SL BWP; and
   performing, by the processor, the sidelink communication with the second terminal using one or more SL BWPs indicated by the reconfiguration information.

3. The operation method according to claim 1, wherein the configuration request message includes one or more of capability information of the first terminal, capability information of the second terminal, and identification information of the second terminal.

4. The operation method according to claim 1, wherein the configuration information of the SL BWP includes further information indicating an initial SL BWP and a configuration mode of an active SL BWP.

5. The operation method according to claim 4, wherein the configuration mode indicates a first configuration mode, a second configuration mode, or a third configuration mode, wherein one SL BWP is activated in a time interval when the first configuration mode is used, the initial SL BWP is always activated and another SL BWP is further activated in a time interval when the second configuration mode is used; and one or more SL BWPs are activated in a time interval when the third configuration mode is used.

6. The operation method according to claim 1, wherein when there is no SL BWP satisfying requirement of the first terminal in the SL BWP list, the reconfiguration of the one or more SL BWPs is determined to be necessary.

7. The operation method according to claim 1, wherein the performing of the sidelink communication includes:
   performing, by the processor, the sidelink communication with the second terminal using a first SL BWP activated among a plurality of SL BWPs indicated by the configuration information;
   in response to determining that switching of the active SL BWP or addition of a new active SL BWP is required, selecting, by a processor, a second SL BWP from the plurality of SL BWPs;

transmitting, by the processor, sidelink control information (SCI) including information indicating the second SL BWP to the second terminal; and performing, by the processor, the sidelink communication with the second terminal using the second SL BWP or using both the first SL BWP and the second SL BWP.

8. The operation method according to claim 1, wherein the performing of the sidelink communication includes:

performing, by the processor, the sidelink communication with the second terminal using a first SL BWP activated among a plurality of SL BWPs indicated by the configuration information;

in response to determining that switching of the active SL BWP or addition of a new active SL BWP is required, transmitting, by the processor, information requesting switching of the active SL BWP or addition of a new active SL BWP to the base station;

receiving, from the base station, information indicating a second SL BWP selected by the base station among the plurality of SL BWPs; and performing, by the processor, the sidelink communication with the second terminal using the second SL BWP or using both the first SL BWP and the second SL BWP.

9. An operation method of a base station in a communication system, comprising:

receiving, by a processor, from a first terminal, a configuration request message requesting configuration of a sidelink (SL) bandwidth part (BWP) used for sidelink communication between the first terminal and a second terminal;

configuring, by the processor, a plurality of SL BWPs used for the sidelink communication;

transmitting, by the processor, a configuration information message including configuration information of the plurality of SL BWPs to the first terminal and the second terminal;

receiving, by the processor, a reconfiguration request message for requesting reconfiguration of the SL BWP from the first terminal;

reconfiguring, by the processor, one or more new SL BWPs that meet requirements of the first terminal; and transmitting, by the processor, a reconfiguration information message including reconfiguration information of the one or more new SL BWPs to the first terminal and the second terminal, wherein the configuration information of the SL BWP includes an SL BWP list, and the SL BWP list includes a bandwidth, a subcarrier spacing, resource block (RB) information, and activation information.

10. The operation method according to claim 9, wherein the configuration request message includes one or more of capability information of the first terminal, capability information of the second terminal, and identification information of the second terminal.

11. The operation method according to claim 9, wherein the configuration information of the plurality of SL BWPs includes further information indicating an initial SL BWP and a configuration mode of an active SL BWP.

12. The operation method according to claim 11, wherein the configuration mode indicates a first configuration mode, a second configuration mode, or a third configuration mode, and wherein one SL BWP is activated in a time interval when the first configuration mode is used, the initial SL BWP is always activated and another SL BWP is further activated in a time interval when the second configuration mode is used, and one or more SL BWPs are activated in a time interval when the third configuration mode is used.

13. The operation method according to claim 9, wherein when there is no SL BWP satisfying requirement of the first terminal in the SL BWP list, the reconfiguration of the SL BWP is requested.

14. A first terminal in a communication system, the first terminal comprising:

a processor; and a memory storing at least one instruction executable by the processor, wherein the at least one instruction causes the processor to:

transmit, to a base station, a configuration request message requesting configuration of a sidelink (SL) bandwidth part (BWP) used for sidelink communication between the first terminal and a second terminal;

receive a configuration information message including configuration information of the SL BWP from the base station;

perform the sidelink communication with the second terminal using one or more SL BWPs indicated by the configuration information;

in response to determining that reconfiguration of the one or more SL BWPs is necessary, transmit a reconfiguration request message to the base station;

receive a reconfiguration information message from the base station, the reconfiguration information message including reconfiguration information of the SL BWP; and perform the sidelink communication with the second terminal using one or more SL BWPs indicated by the reconfiguration information, wherein the configuration information of the SL BWP includes an SL BWP list, and the SL BWP list includes a bandwidth, a subcarrier spacing, resource block (RB) information, and activation information.

15. The first terminal according to claim 14, wherein the configuration request message includes one or more of capability information of the first terminal, capability information of the second terminal, and identification information of the second terminal.

16. The first terminal according to claim 14, wherein the configuration information of the SL BWP includes further information indicating an initial SL BWP and a configuration mode of an active SL BWP.

17. The first terminal according to claim 14, wherein in the performing of the sidelink communication, the at least one instruction further causes the processor to:

perform the sidelink communication with the second terminal using a first SL BWP activated among a plurality of SL BWPs indicated by the configuration information;

in response to determining that switching of the active SL BWP or addition of a new active SL BWP is required, select a second SL BWP from the plurality of SL BWPs;

transmit sidelink control information (SCI) including information indicating the second SL BWP to the second terminal; and perform the sidelink communication with the second terminal using the second SL BWP or using both the first SL BWP and the second SL BWP.

* * * * *